(12) United States Patent
White et al.

(10) Patent No.: US 6,190,192 B1
(45) Date of Patent: *Feb. 20, 2001

(54) CONFIGURABLE INTERFACE CONNECTOR

(75) Inventors: Rowland White, Lunenburg; Benjamin Misrahi, Haverhill, both of MA (US)

(73) Assignee: Molex Incorporated, Lisle, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/190,328

(22) Filed: Nov. 12, 1998

(51) Int. Cl.[7] .................................................. H01R 25/00
(52) U.S. Cl. ................................. 439/292; 439/160
(58) Field of Search .................................. 439/242, 284, 439/286, 287, 288, 289, 290, 291, 293, 294, 295, 159, 160, 152, 157, 460, 372

(56) References Cited

U.S. PATENT DOCUMENTS 2,763,846 * 9/1956 Healy ..................................... 439/460
4,303,292 * 12/1981 McNeel ................................. 439/152
4,734,052 * 3/1988 Vandame .............................. 439/293

* cited by examiner

Primary Examiner—Gary F. Paumen
Assistant Examiner—Ross Gushi
(74) Attorney, Agent, or Firm—A. A. Tirva

(57) ABSTRACT

A communications infrastructure connector system comprises a pair of engageable hermaphroditic connector units. Each unit can house a plurality of connectors which mate with corresponding connectors of the other unit. Each unit has a handle comprising a pair of eccentrically mounted pivot arms. On movement of the handles of the two connector units towards one another, an arcuate portion each handle comes into contact with the same portion of the other handle. The eccentric mounting causes the two connector units to be forced apart.

16 Claims, 8 Drawing Sheets

CONFIGURABLE INTERFACE CONNECTOR

FIELD OF THE INVENTION

This invention relates to communications infrastructure systems, and in particular to rapid interconnecting configurable interface connectors for use in such systems.

BACKGROUND OF THE INVENTION

Most modern commercial building are equipped with power and communications cabling which is routed using a "homerun" architecture in which wires and cables are run from a central location, such as a communications patch panel frame, point-to-point to an outlet. The wiring or cabling is continuous and is sufficiently long to make the connection.

It has been recognised that this type of approach to wiring and cabling is undesirable, for example, it causes great problems when office space is reorganised. If a particular workspace is moved to a position more distant the central distribution location, the existing wiring has to be replaced. Even if the existing wiring or cabling is sufficiently long, rerouting a long span can be very difficult.

In an attempt to overcome this problem, an architecture has been proposed which uses rapid interconnecting configurable interface connectors (RICIs).

In this architecture, a workspace is provided with a number of horizontal rises each of which connect to the central locations, for example the communications center, and each horizontal riser comprises a number of trunk lines. A RICI connector is attached to each trunk line in the horizontal riser and the RICIs are distributed along the horizontal risers such that a RICI is easily accessible from any part of the office space. Each work space is cabled by connecting a drop cable to the RICI and running that drop cable to the workspace. Thus, if the work space is moved, the cabling can be disconnected at the RICI, which is usually accessible and connected to a different RICI. If no other is available, a different length drop cable can be used which is far easier than replacing the whole cable run from the communications/power distribution centre to the work space.

The horizontal risers may be located in the false ceiling of an office space or under a false floor. They are suitable for use in any environment where it is desired to cable a number of different user locations.

One design of RICI has been proposed which comprises a generally cylindrical half which connects with a correspondingly shaped RICI by a threaded collar which rotates around a screw thread on the mating faces of the two RICIs. One of the RICIs is attached to the dropside cable and the other RICI is attached to the horizontal riser side. The two opposed RICIs carry opposed mating connections which come into contact as the two RICIs are connected using the screw threaded collar.

We have appreciated that the RICI based architecture provides considerable advantages. However, existing designs of RICI connectors are not satisfactory, for example, the use of screw threads to connect the two RICIs makes assembly and disassembly difficult, especially when the RICIs are located in confined spaces which are hard to access in a ceiling space or underfloor.

The present invention aims, therefore, to provide an improved RICI connector which will enhance the inherent advantages of RICI based architecture.

SUMMARY OF THE INVENTION

According to the invention there is provided a communications infrastructure connector system comprising: first and second hermaphroditic connector units, the connector units being engageable to form a connector system, each connector unit comprising a housing including a mating face for receiving a plurality of connectors, each of the plurality of connectors forming one half of a connector pair with a corresponding connector on the housing of the other of said first and second hermaphroditic connector units; guide means arranged on the housing for guiding the housing into engagement with the housing of the other of said hermaphroditic connector units; and means for disengaging the connector units comprising at least one movable arm, the at least one arm being arranged on each of the first and second connector units such that movement of the arm of each connector units urges the first and second connector units apart.

The invention further provides a rapid interconnecting configurable connector system comprising: first and second hermaphroditic engageable connector units, each connector unit comprising a housing including a mating face including means for receiving a plurality of connectors; and means for disengaging the first and second connector units from one another, comprising at least one eccentric arm pivotally mounted on each housing such that pivoting of the arms of the first and second connectors in opposed directions causes the arms to abut over a portion of their lengths and urges the housings of the first and second connector units out of mutual engagement.

The invention also provides a rapid interconnecting configurable interface connector unit comprising: a housing having a mating face and receiving thereat a plurality of connectors, each connector being one of a connector pair; and a pivot arm eccentrically mounted on a side wall of the housing; wherein the connector unit is adapted to mate with a corresponding connector unit and the plurality of connectors mate with a plurality of like connectors on the corresponding connector, the pivot arm being arranged such that movement thereof in a direction towards the corresponding connector unit causes a portion of the first arm to engage a corresponding portion of the pivot arm of the corresponding connector unit and so urge the connector unit and the corresponding connector unit apart.

Embodiments of the invention have the advantage of providing a connection between a riser cable and a drop cable which is hermaphroditic and can be made using a single set of mold tools.

Embodiments of the invention have the further advantage that the two connector units may be easily separated which is particularly useful as the units tend to be mounted in areas which are difficult to access, such as in ceilings or under floors.

Embodiments of the invention have the further advantage that the connectors are housed in an environment into which dust cannot penetrate. Again this is important as the connector units are intended to be mounted often in a hostile environment.

Embodiments of the invention have the further advantage that a plurality of different connector types may be found within the same unit, for example, the connector may be configured for communications services using twisted pair copper wire and RJ connectors, coaxial wire or fibre optics. AC power may also be included although safety regulations may not permit this in the same connector unit as communications.

BRIEF DESCRIPTION OF THE DRAWINGS

A preferred embodiment of the invention will now be described, by way of example only, and with reference to the drawings, in which.

DETAILED DESCRIPTION OF PREFERRED EMBODIMENT

The assembly 10 illustrated in the figures comprises a pair of hermaphroditic RICI (rapid interconnecting configurable interface connectors) 12, 14 which are intended to connect a trunk cable carrying a number of services such as voice, data, PC, AC mains etc from a communications/power hub to a drop side cable which takes those services to an individual work station or work area.

Figure 3:
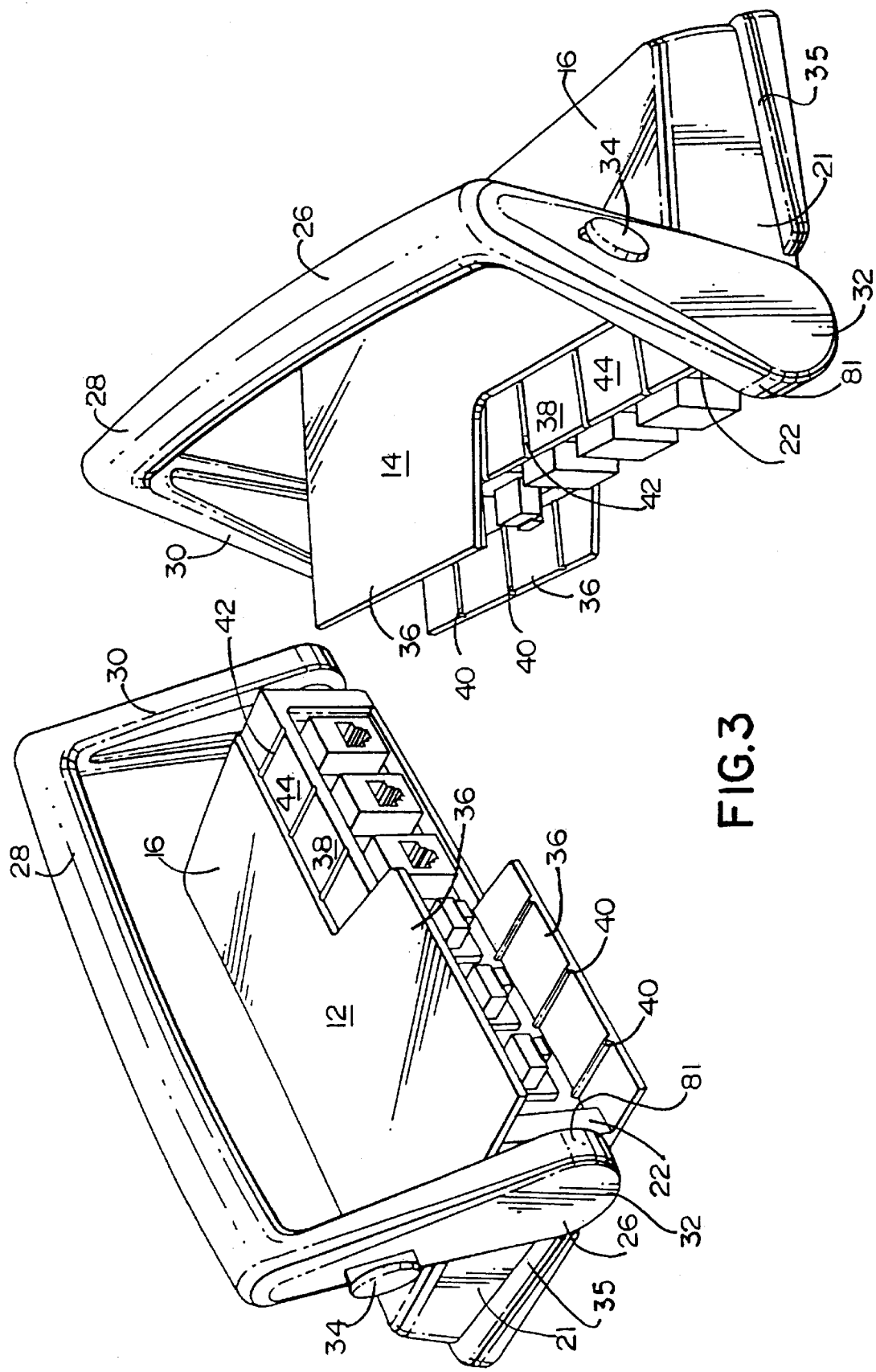
FIG. 3 is a perspective view of the two RICI connectors disengaged.
Figure 4:
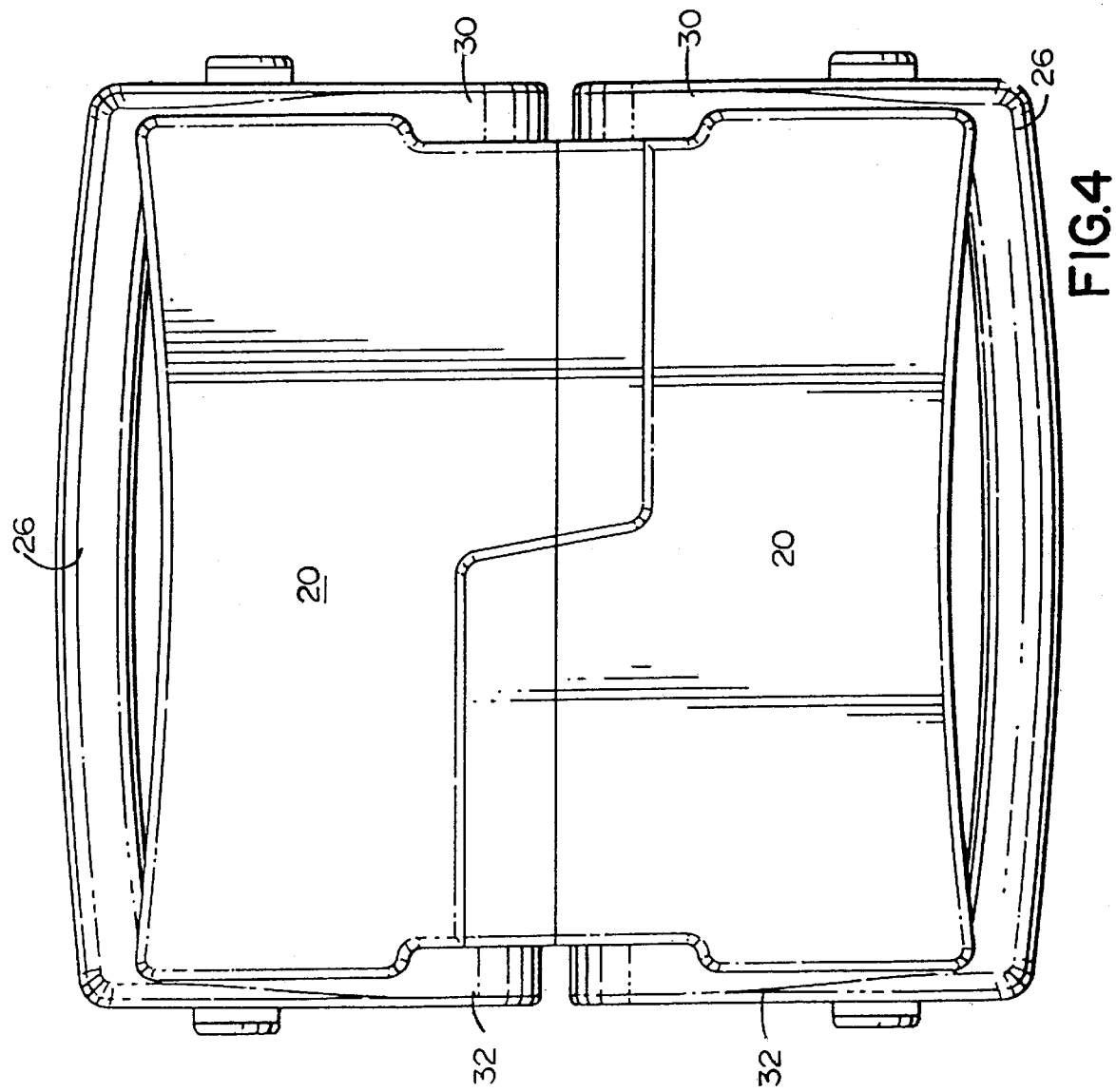
FIG. 4 is a underside view of the connectors when engaged.

The two connectors are identical enabling them to be produced from the same mold. Each comprises a body having an upper wall 16, a lower wall 18 (FIG. 4), a rear wall 20, a pair of side walls 21 and a front wall 22 (FIG. 3). The rear wall has a series of six apertures 24 each of which receive cabling or wiring for one services to be available to the work station or work area.

A handle 26, comprising a cross member 28 and a pair of arms 30, 32 is eccentrically and pivotally attached to the side walls, the handle arms taper from their pivoted ends, at which point the ends of the arms are generally arcuate towards the cross member 28. As will be explained, the shape of the arms is important in separating the two RICI connections.

Each of the arms 30, 32 carries a lozenge shape bead 34 which projects outwards from the arm. This bead may be used to hang the connector in situ.

Figure 1:
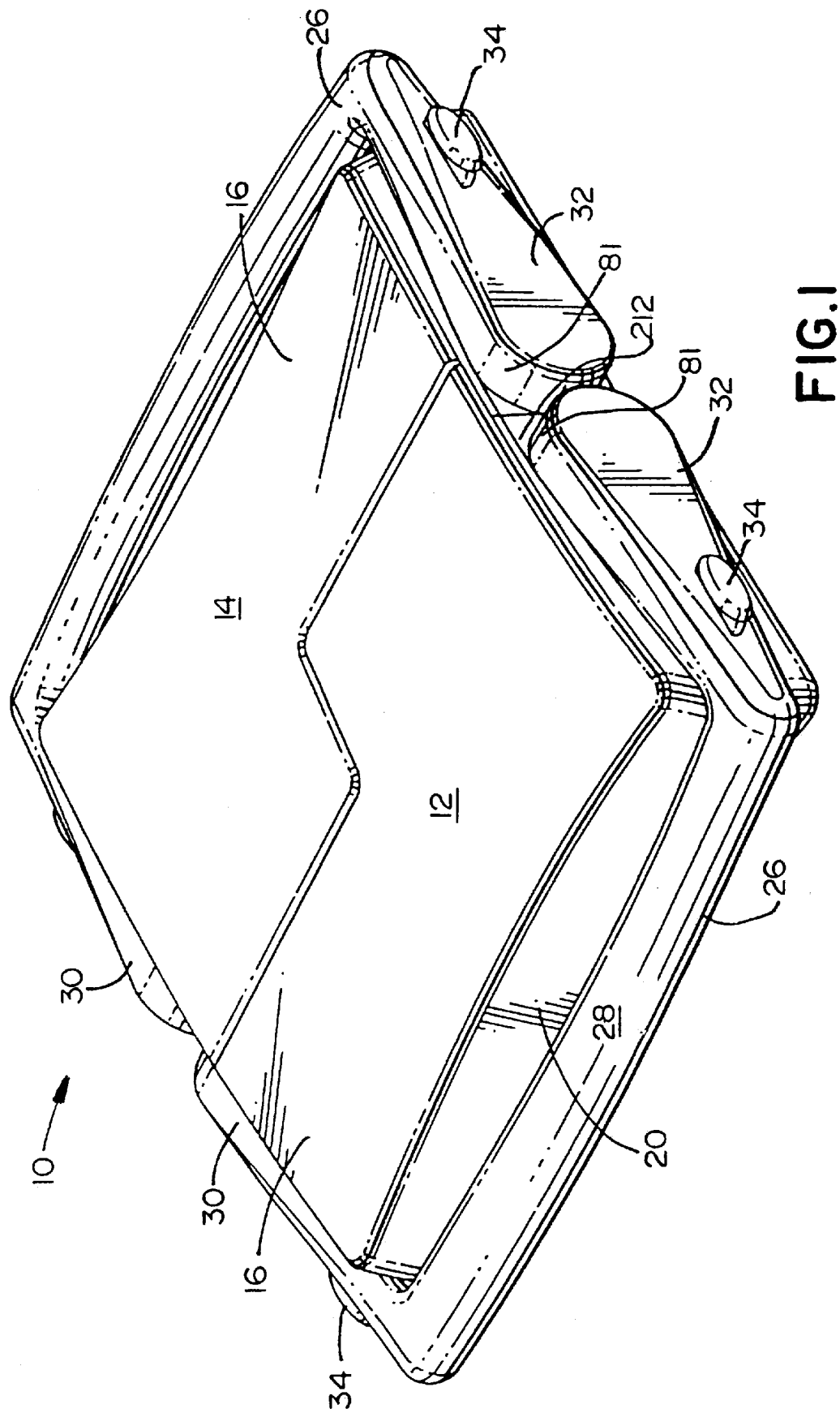
FIG. 1 is a perspective view of a pair of RICI connectors embodying the invention and shown in the engaged position.

The bottom ends of the rear wall included a stepped projection 35 and the side walls 21 carry a corresponding step along their length as far as the point of connection of the handle arms. The handle arms rest on these steps when the connectors are joined as shown in FIG. 1.

Referring to FIG. 3, the front, mating end of the connectors each comprise a portion 36 of the upper and lower walls 16, 18 which overhang the front wall 22 and a portion 38 which is set back from the front wall. A series of ribs 40 are provided on the inner surfaces of the overhanging portions which engage with corresponding grooves 42 on the inner shell 44 of the housing which is exposed by the cutaway portion. It can be seen from FIG. 3 that the recessed and overhanging portions are exactly symmetrical about a central axis ensuring that the two identical halves fit together.

Figure 5:
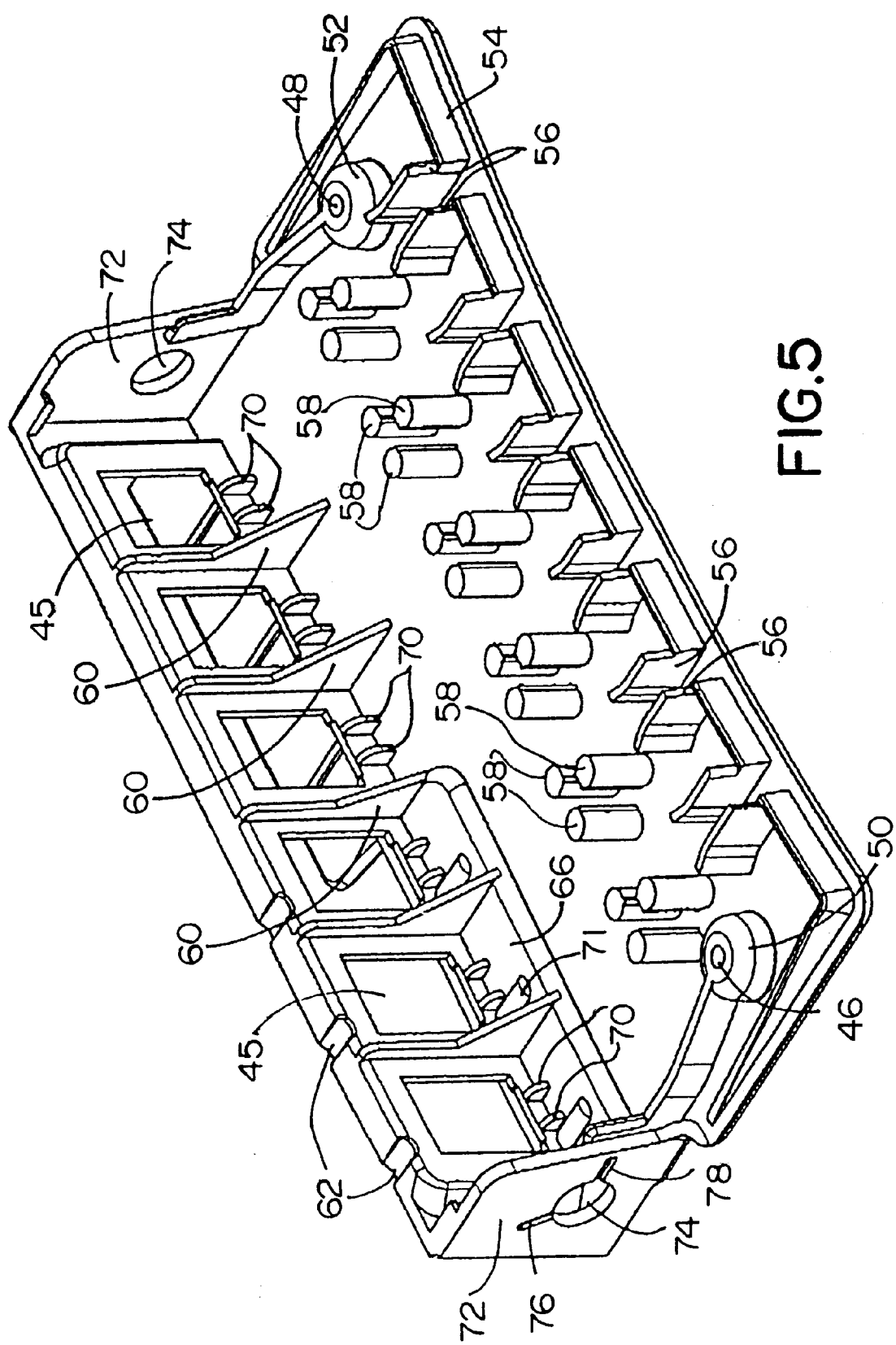
FIG. 5 is a perspective view of a bottom half of a connector.

As can be seen from FIG. 5, the front wall of each connector has a series of six apertures 45 each of which can receive an electrical, optical or other connector. It will be appreciated that each of connectors mounted on the front wall is connected to the wires of the cable introduced through one of the apertures in the rear wall 20. Thus, the pair of RICI connectors can deliver up to six separate services to the work station or work area.

Furthermore, the nature of the connectors can be mixed, for example, one or more may be an RJ type connector, one or more an optical connector, a further one a mains connector etc. In FIG. 3, each connector is shown having three male RJ 45 type connectors mating with three female RJ 45 type connectors. It will be understood that this is simply one possible configuration. It will also be understood that the two connecting RICIs must be fitted with corresponding male/female connector pairs. It is possible to connect two male or two female connectors using a male/male or female/female adaptor but this is undesirable as it will not enable the two connectors to be properly closed. This is important as the RICIs are often housed in hostile environments where dust in particular is prevalent. It is also undesirable to introduce additional connections into the line as each connection can reduce signal performance.

Figure 6:
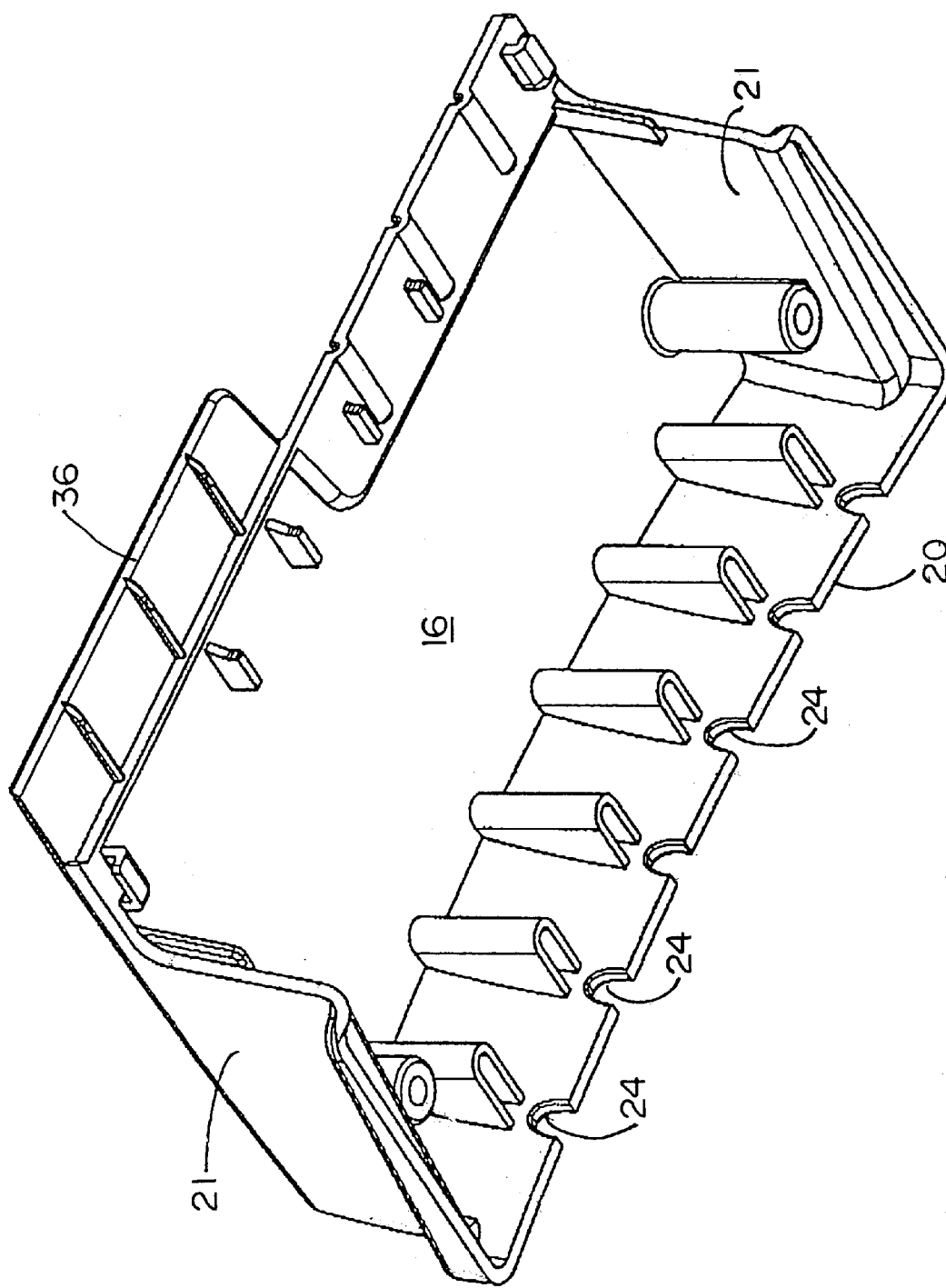
FIG. 6 is a view of the underside of the top half of FIG. 5.

Turning now to FIGS. 5 and 6 it will be seen that the upper wall 16, the rear wall 20 and the side walls 21 are molded as a single piece. The bottom wall and the front wall 22 are also molded as a single piece. The two molded pieces are joined together by a pair of screws which are retained in screw holes 46, 48 in pillars 50, 52 on the inner faces of the upper and lower walls.

The bottom wall has a flange 54 running along its sides and rear edge to assist location of the top mold half. The flange 54 is interrupted at six points along the rear edge corresponding to the six cable apertures 24 on the rear wall 20. At each of the interruptions, there is provided a pair of cable guides 56 which are integral with the flange. Associated with each cable guide is a group of three tension posts 58 about which the cable is wrapped so that any tension in the cable does not break any of the terminations of the connector mounted on the front wall.

Figure 7:
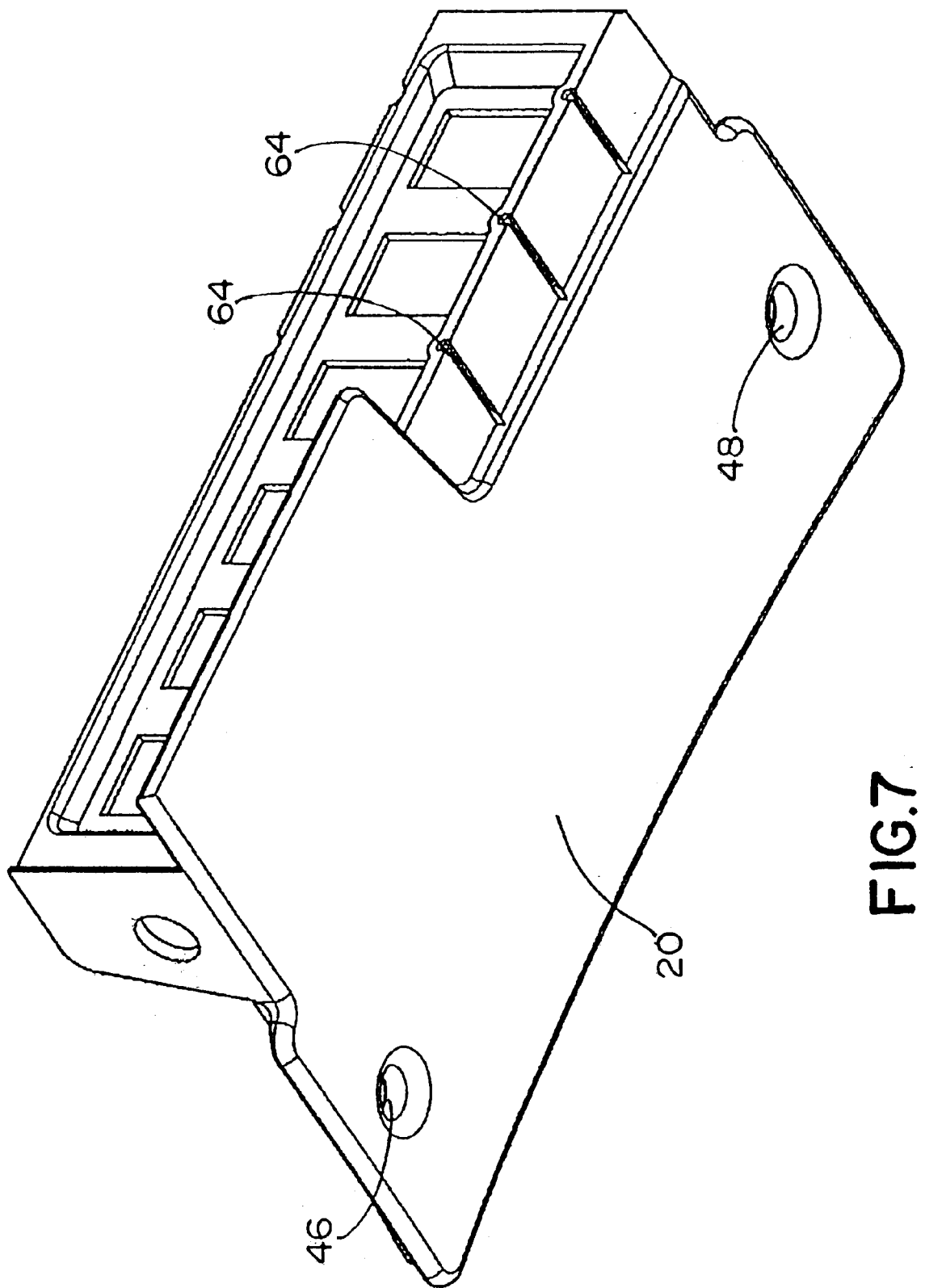
FIG. 7 is a perspective view of the bottom half of the connector.

The front wall, in addition to the six apertures, has six strengthening ribs 60 between its rear face and the bottom wall. The upper surface of the front wall has, on one side, three grooves 62 which correspond to the ribs on the underside of the overhanging portion of the upper wall. As can be seen from FIG. 7, there are similar grooves 64 on the underside. In order to accommodate the overhanging portion of the lower wall of the mating RICI connector, one portion 66 of the bottom wall is slightly raised, corresponding to the size and shape of the mating overhang. The shape of the grooves can be seen in FIG. 5 as raised areas 71.

In addition to the strengthening ribs 60 a pair of mounting ribs 70 is arranged beneath each aperture on the front wall. These ribs assist in mounting the connectors on the front wall.

A pair of flanges 72 project up from the sides of the bottom mold half and are connected to the front wall 22. The flanges each have an aperture 74 one of which having a pair of slots 76, 78 extending radially outwards; the slots are separated by an angle of approximately 120°. The aperture 74 receives a boss on the inside of the base of the handle arms and the slots receive a corresponding tab on the handle to hold the arms in either an open or a closed position.

Figure 8:
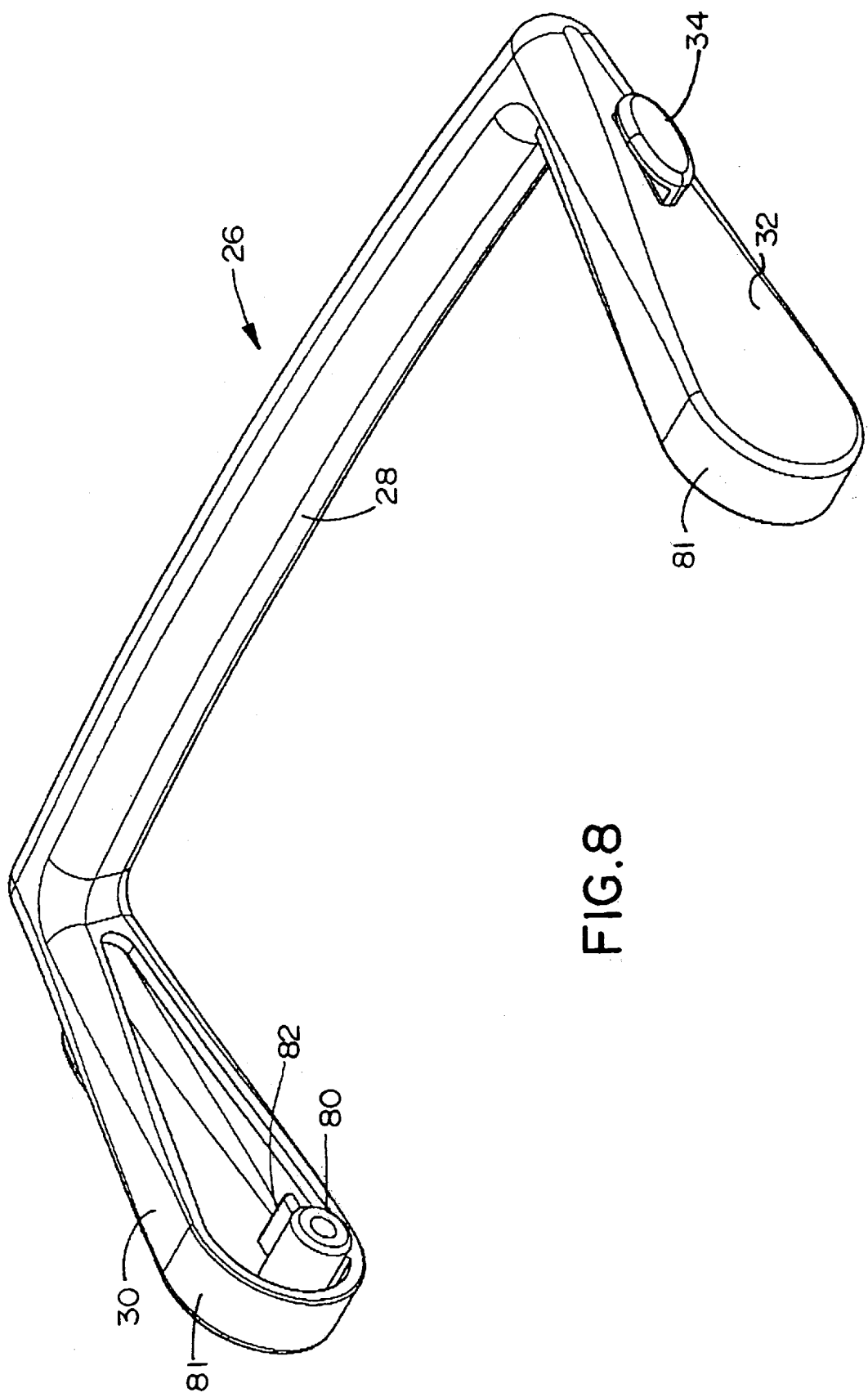
FIG. 8 is a perspective view of the eccentrically mounted handle.

The handle is shown in FIG. 8. On the inside of one of the arms is a boss 80 one of which has a tab 82 extending radially outwards. To engage or disengage the handle, the handle must be moved first along its axis of rotation so that the tab first clears the corresponding slot on the housing flange. The bosses are located off centre so that the handle pivots eccentrically on the connector housing.

In use, the connectors to be housed in one of the RICIs are first terminated to their respective wires and then mounted on the front wall of the RICI. The cables are then wrapped around the tension post and fed through the cable guides. The two mold halves can then be screwed together. Two compatibly assembled RICIs having mating connector pairs can be assembled simply by sliding them together with the handles in the flush position shown in FIGS. 1 and 4. The grooves and ribs in the upper and lower walls assist in correctly locating the two RICI connectors.

Figure 2:
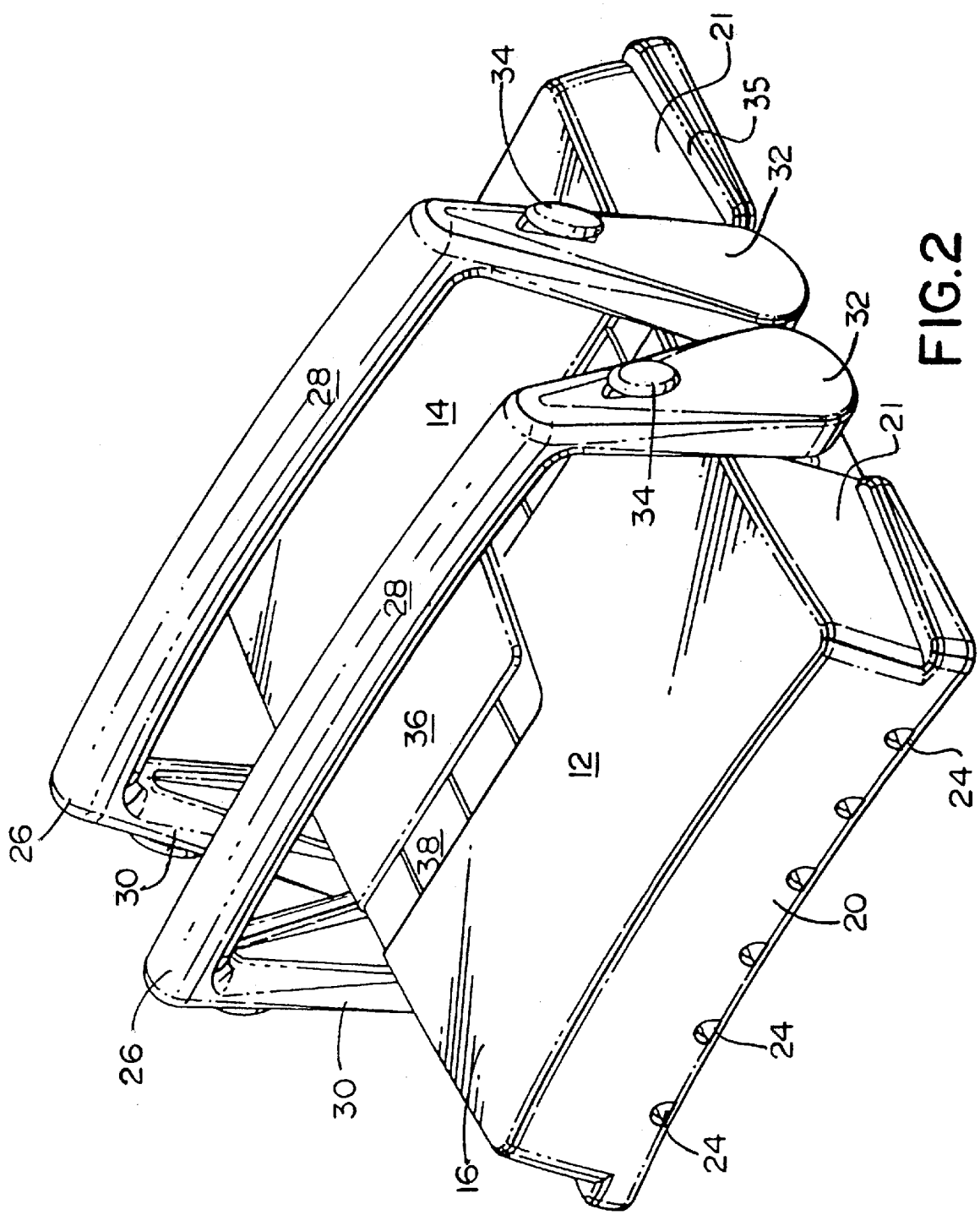
FIG. 2 is a similar view to FIG. 1 showing how the connectors are disengaged.

To disengage the connectors, the two handles are simply lifted up, as shown in FIG. 2. The rotation of the handles, which as can be seen from FIG. 8 is eccentric causes the two pairs of arms to abut at their bases forcing them apart from one another. Each of the arms has a portion of its surface which forms an abutment surface with a corresponding portion of the opposed arm.

This abutment surface 81 is arcuate allowing the two arms to roll over one another as the arms pivot. This provides a very simple, easy to separate, pair of RICI connectors which can be connected and disconnected in relatively inaccessible and difficult location.

The embodiment described has many advantages over prior art RICI connectors. It is easy to assemble and separate, cheap to manufacture as only one mold tool is required for the two connector bodies, and ensures a reliable connection in an environment which is protected from external factors such as dust.

We claim:

1. A communications infrastructure connector system comprising:

first and second hermaphroditic connector units, the connector units being engagable to form a connector system, each connector unit comprising:

a housing including a mating face for receiving a plurality of connectors, each of the plurality of connectors forming one half of a connector pair with a corresponding connector on the housing of the other of said first and second hermaphroditic connector units;

guide means arranged on the housing for guiding the housing into engagement with the housing of the other of said hermaphroditic connector units; and means for disengaging the connector units comprising at least one arm pivotal with respect to the housing, the at least one arm being eccentrically mounted and arranged on each of the first and second connector units such that rotation of the arm of each housing in an opposed direction causes the arms to abut and further rotational force urges the first and second connector units apart.

2. A communications infrastructure connector according to claim 1, wherein each housing has a pair of arms on opposed side walls thereof, the pair of arms being connected by a cross-piece to form a handle.

3. A communications infrastructure connector according to claim 1, wherein the mating face includes a plurality of apertures, each for receiving one half of a connector pair, the other half of said connector pair being received in the corresponding aperture of the other of said first and second connectors.

4. A communications infrastructure connector according to claim 1 wherein each housing further comprises a rear wall, the rear wall having a plurality of apertures at least equal to the number of connectors received at the mating face, to receive cable for termination to the connectors at the mating face.

5. A communications infrastructure connector according to claim 1, wherein each arm has an eccentrically mounted pivot boss received in an aperture in a side flange of the housing, one said pivot boss on one of said arms having a tab extending radially therefrom and a slide flange having a pair of slots extending radially from the aperture, whereby the tab engages in the slots to define the limits of pivotal movement of the arm.

6. A communications infrastructure connector according to claim 1, wherein one of said pair of connector units receives connectors terminated to a drop side cable and the other of said pair of connector units receives connector terminated to a riser cable.

7. A communications infrastructure connector according to claim 1, wherein the guide means comprises ribs on the housing of one of the connector units and grooves to receive the ribs on the housing of the other of the connector units.

8. A communications infrastructure connector according to claim 7, wherein the housings each include upper and lower walls and the ribs are arranged on portions of the upper and lower walls overhanging the mating face of the housing.

9. A communications infrastructure connector according to claim 5, wherein the overhanging portions of the upper and lower walls extend along approximately one half the width of the mating face.

10. A communications infrastructure connector according to claim 1, wherein each housing further includes a bottom wall, the bottom wall carrying a means for preventing removal of wires or cables terminated to the connectors.

11. A communications infrastructure connector according to claim 10, wherein the removal preventing means comprises a plurality of tension posts about which wires or cables can be wrapped.

12. A communications infrastructure connector according to claim 10, wherein the bottom wall further includes a plurality of cable guides.

13. A rapid interconnecting configurable connector system comprising: first and second hermaphroditic engageable connector units, each connector unit comprising a housing including a mating face including means for receiving a plurality of connectors; and means for disengaging the first and second connector units from one another, comprising at least one eccentric arm pivotally mounted on each housing such that pivoting of the arms of the first and second connectors in opposed directions causes the arms to abut over a portion of their lengths and urges the housings of the first and second connector units out of mutual engagement.

14. A rapid interconnecting configurable connector system according to claim 13, wherein the abutting portions of the arms comprise an arcuate section of each arm.

15. A rapid interconnecting configurable connector unit comprising: a housing having a mating face and receiving thereat a plurality of connectors, each connector being one of a connector pair; and a pivot arm eccentrically mounted on a side wall of the housing; wherein the connector unit is adapted to mate with a corresponding connector unit and the plurality of connectors mate with a plurality of like connectors on the corresponding connector, the pivot arm being arranged such that movement thereof in a direction towards the corresponding connector unit causes a portion of the first arm to engage a corresponding portion of the pivot arm of the corresponding connector unit and so urge the connector unit and the corresponding connector unit apart.

16. A rapid interconnecting configurable connector unit according to claim 15, wherein the engaging portion of the pivot arm is an arcuate portion.

* * * * *